Patented Jan. 11, 1944

2,338,717

UNITED STATES PATENT OFFICE 2,338,717

CERAMIC MIX AND METHOD OF PREPARING THE SAME

Cameron G. Harman, Urbana, Ill.

No Drawing. Application August 2, 1940,
Serial No. 350,165

8 Claims. (Cl. 106—39)

This invention relates to an improved ceramic mix and method of preparing the same, and more particularly to a ceramic mix including a small proportion of a gelatinized cereal flour.

The preparation of ceramic materials by the plastic or dry press processes involves the mixing of ceramic materials of the proper type followed by working, shaping, pressing, molding, turning, extruding, or other forming operation, after which the product is dried and fired. The present application does not relate to ceramic processes or articles made by processes in which the products are formed directly from melts, such as glass and glassware.

In carrying on the working and shaping processes there are several stages of the processes at which different difficulties may arise, depending upon the method being followed and the materials being employed. One of these difficulties is lack of, or poor, flowability under pressure of certain materials. This may occur for example in extrusion, and equally as important but more limited in degree, in dry pressing in which it is desirable that the product assume the most compact form under a reasonably low pressure. The ability of the ceramic mix to flow may be increased by the use of a lubricant, and in this connection it has been discovered that gelatinized cereal flour, and particularly gelatinized corn flour, when used in the proper proportions, acts as a superior lubricant to promote maximum compacting under minimum pressure.

A second difficulty frequently encountered is the lack of sufficient rigidity and strength in ceramic articles prior to the time that they have been dried or fired. For example, many ceramic materials lack sufficient strength before drying and the gelatinized corn flour provides an increase in strength in what is known as the green bonding strength of such materials.

Likewise, many ceramic materials are weak or easily broken or chipped after drying and before firing. The addition of a small percentage of gelatinized corn flour has a remarkable effect in increasing the dry strength of ceramic materials.

Some ceramic materials are shaped by extruding them through a die or by forcing them into a mold, and in some cases the ceramic mix lacks sufficient plasticity or moldability to permit this operation to be properly carried out. The addition of a small quantity of gelatinized corn flour acts as a superior plasticizing agent in this respect. There is unfortunately no adequate way of measuring plasticity so that a plasticity index cannot be categorically established. Experience in actual operation, however, has demonstrated clearly the value of the gelatinized material for this purpose.

It frequently happens that ceramic materials become too moist, either before or during mixing. Surprisingly enough, the addition of a small amount of gelatinized corn flour will overcome excess moisture and produce a suitably workable material. This result is of particular value because, as it will be noted, the gelatinized corn flour material in this way makes a product which is too plastic to be properly workable, whereas, if the product is not plastic enough, it also improves its workability.

The difficulties which have been set forth do not of course arise with all ceramic mixes and some of them are typical of one type of processing, whereas others are typical of a different type of processing. The present invention is particularly valuable because the addition of a small quantity of gelatinized corn flour to bring about a desired improvement in the body does not accentuate any of the difficulties so that it may be added in the first instance without fear that it will adversely affect the processing which is to be carried out afterwards.

As an example of the value of gelatinized cereal flour when employed as a lubricant to aid in the compacting of particles during dry pressing or dust pressing of ceramic articles, particles of calcined flint clay of definite particle size grading were mixed in accordance with standard procedure and with them were included various proportions of gelatinized corn flour. In other samples, other materials were incorporated for the purpose of comparison of the lubricating effects. In each case the materials were thoroughly mixed, the mixture was transferred quantitatively to a dry-press mold and the required pressure applied for three minutes. The mold was then removed from the press and the volume of the pressed sample carefully measured.

The figures in Table I as follows, show the volume in cubic inches occupied in each case by 22.50 grams of the ceramic material, the weight of any lubricant added being not included in this amount. The volumes are shown for each of three pressures, namely, 1,000 lbs., 2,000 lbs., and 3,000 lbs. per square inch. Even though the volume of lubricant added swells the true volume of the mix in the first instance, a small addition of gelatinized corn flour reduces the total bulk volume of the pressed mix. Too large an addition of gelatinized corn flour will obviously defeat the purpose for which it was intended. The optimum proportion of gelatinized cereal depends, of course, on the properties of the ceramic materials in the mix, but will seldom exceed about 0.5%.

TABLE I

*Influence of lubricants on the density of packing of ceramic mixes by dry pressing*

| Corn product | Amount admixed | Method of gelatinization | Volume in cu. in. of sample¹ when subjected to the following pressures | | |
|---|---|---|---|---|---|
| | | | 1,000 lbs./in.² | 2,000 lbs./in.² | 3,000 lbs./in.² |
| None | Per cent | | 0.602 | 0.574 | 0.567 |
| Gelatinized corn flour | 0.5 | Hot rolls | 0.595 | 0.571 | 0.563 |
| Do | 1.0 | do | 0.597 | 0.577 | 0.564 |
| Do | 2.0 | do | 0.604 | 0.576 | 0.567 |
| Corn flour | 0.5 | NaOH solution | 0.584 | 0.560 | 0.550 |
| Do | 0.5 | Hot water | 0.595 | 0.568 | 0.563 |
| Do | 0.5 | Not gelatinized | 0.590 | 0.566 | 0.559 |
| Do | 1.0 | do | 0.605 | 0.580 | 0.570 |
| Corn starch | 0.5 | do | 0.586 | 0.566 | 0.553 |
| Do | 1.0 | do | 0.599 | 0.576 | 0.562 |

¹ Each sample contained 22.50 grams of calcined flint fire clay grains, the cereal product addition and 1.5 c.c. of water.

Table II shows the effect of the addition of gelatinized corn flour on the green bonding strength of particular ceramic mixes. The particular ceramic material is indicated in the first column. The corn product added is shown in column 2, per cent added is shown in column 3, and the method of gelatinization in column 4:

TABLE II

*Effect of corn products on the green bonding strength of ceramic mixes*

| Ceramic material | Corn product | Amount admixed | Method of gelatinization | Compressive strength before drying | Remarks |
|---|---|---|---|---|---|
| 10 mesh grog, hand molded | None | Per cent | | Lbs./sq. in. Zero | |
| | Corn flour | 2.0 | Hot water | 5 | |
| | do | 2.0 | Alkali solution | 7 | Elastic. |
| | Gelatinized corn flour | 2.0 | Hot rolls | 3 | |
| Non-plastic grains dry-pressed | None | | | 38.5 | |
| | Corn flour | 2.0 | Hot water | 42.2 | |
| | do | 2.0 | Alkali solution | 47.0 | Do. |
| | Gelatinized corn flour | 2.0 | Hot rolls | 39.1 | |
| | Corn starch | 2.0 | Alkali solution | 46.4 | Do. |

In Table III is shown the effect of gelatinized corn flour and other products on the dry strength of dry pressed ceramic materials. The ceramic material used in these tests was the same material which was the basis of Table I.

TABLE III

*Effect of various corn products on the dry strength of dry pressed ceramic mixes*

| Corn product | Amount admixed | Method of gelatinization | Compressive strength in dry state |
|---|---|---|---|
| | Per cent | | Lbs./sq. in. |
| Corn starch | 0.5 | Not gelatinized | 30 |
| Do | 2.0 | do | 40 |
| Corn flour | 0.5 | do | 30 |
| Do | 2.0 | do | 40 |
| Gelatinized corn flour | 0.5 | Hot rolls | 400 |
| Do | 1.0 | do | 580 |
| Do | 1.5 | do | 780 |
| Do | 2.0 | do | 1,120 |
| Corn starch | 1.0 | Hot water | 500 |
| Corn flour | 1.0 | do | 600 |
| Do | 1.0 | Alkali solution | 640 |
| None | | | 30 |

It will be seen from the table that non-gelatinized starch and flour have substantially no effect upon the compressive strength of the material, whereas the gelatinized material increases the strength at least thirteenfold and in some cases as much as thirty-sevenfold.

Table IV illustrates the effect of gelatinized corn flour and other products on the dry strength of clay of various types. The type of clay is illustrated in the first column and the type of material added is shown in the second column. As will be noted, the addition of corn flour which had not been gelatinized, slightly reduced the modulus of rupture of the various materials, whereas the gelatinized material in all cases increased the modulus of rupture.

Table IV

*Effect of various corn products on the dry strength of clays*

| Type of clay | Corn product | Amount admixed | Method of gelatinization | Modulus of rupture |
|---|---|---|---|---|
| | | Per cent | | Lbs./sq. in. |
| Plastic fire clay | Gelatinized corn flour | 0.5 | Hot rolls | 1,000 |
| | do | 1.0 | do | 1,200 |
| | do | 1.5 | do | 1,450 |
| | do | 2.0 | do | 1,405 |
| | None | | | 850 |
| | Corn flour | 1.0 | Not gelatinized | 825 |
| | do | 1.0 | Hot water | 1,375 |
| | do | 1.0 | Alkali solution | 1,485 |
| | Corn starch | 1.0 | Hot water | 1,180 |
| Sandy shale | None | | | 280 |
| | Gelatinized corn flour | 0.5 | Hot rolls | 440 |
| | do | 1.0 | do | 660 |
| | do | 1.5 | do | 790 |
| | Corn flour | 1.0 | Not gelatinized | 245 |
| | do | 1.0 | Hot water | 690 |
| | do | 1.0 | Alkali solution | 785 |
| Surface clay | Gelatinized corn flour | 0.5 | Hot rolls | 500 |
| | do | 1.0 | do | 559 |
| | do | 1.5 | do | 710 |
| | None | | | 299 |
| Loess | Gelatinized corn flour | 0.5 | Hot rolls | 484 |
| | do | 1.0 | do | 594 |
| | do | 1.5 | do | 690 |
| | None | | | 278 |
| | Corn flour | 1.0 | Not gelatinized | 265 |
| | do | 1.0 | Hot water | 620 |
| Blended clays | None | | | 277 |
| | Gelatinized corn flour | 1.0 | Hot rolls | 726 |
| | do | 2.0 | do | 831 |
| | Corn flour | 1.5 | Alkali solution | 933 |

Table V illustrates the effect of various corn products on the dry strength of non-plastic ceramic materials:

Table V

*Effect of various corn products on the dry strength of non-plastic ceramic mixes*

| Ceramic material | Corn product | Amount admixed | Method of gelatinization | Modulus of rupture, added dry |
|---|---|---|---|---|
| | | Per cent | | Lbs./sq. in. |
| Flint clay grog | None | | | 50 |
| | Gelatinized corn flour | 0.5 | Hot rolls | 210 |
| | do | 1.0 | do | 405 |
| Diaspore | None | | | 50 |
| | Gelatinized corn flour | 0.5 | Hot rolls | 340 |
| | do | 1.0 | do | 710 |
| 80% grog, 20% clay | None | | | 105 |
| | Gelatinized corn flour | 0.5 | Hot rolls | 400 |
| | do | 1.0 | do | 590 |
| | do | 1.5 | do | 680 |
| | do | 2.0 | do | 780 |
| | Corn flour | 0.5 | Hot water | 255 |
| | do | 1.0 | do | 360 |
| | do | 1.5 | do | 485 |
| | do | 2.0 | do | 605 |
| | Corn starch | 1.0 | do | 360 |
| SiC—40 mesh grains | None | | | Nil |
| | Corn flour | 1.0 | Boiled in water | 170 |
| | do | 1.0 | NaOH solution | 147 |
| | Corn starch | 1.0 | do | 160 |
| Silica brick mix | Corn flour | 1.0 | Hot water | 439 |
| | Gelatinized corn flour | 1.0 | Hot rolls | 440 |
| | Corn starch | 1.0 | Hot water | 417 |
| | None | | | 193 |

The plasticizing ability of the gelatinized corn flour cannot be adequately defined, as already explained. It is possible, however, to show the amount of this material required to render a non-plastic material sufficiently plastic to be extruded from a die. For example, a fire clay grog comprising calcined and ground flint clay required 5% of gelatinized corn flour to render it sufficiently plastic for extrusion, whereas, the same material required 10% of bentonite or 40% of pot clay. In each case the per cent is based upon the total mix, including the plasticizer. As another example, diaspore, when ground to 20 mesh and finer, will not extrude at any water content. With the addition of 2% of gelatinized corn flour, this product in the same state of division will extrude in a stiff column at the appropriate water content. The same material will extrude with 1.5% of the gelatinized corn flour but not very well. The addition of 3% bentonite to diaspore of the same quality accomplishes the same results as the addition of 1.5% of gelatinized corn flour.

In all of the foregoing examples, the gelatinized cereal flour may be added to the ceramic materials before or during mixing. If added after mixing, an additional mixing operation is of course desirable so that it is considered that the addition of the material after mixing is the equivalent of adding it during or before mixing. Furthermore, the gelatinized material can be added either in the dry state or colloidally "dissolved" in water.

It has not been attempted in this application to exhaustively describe the various formative steps which are used in the various ceramic processes. Each ceramic process now known for the production of ceramic products, excepting glasses and enamels, of the type here discussed, utilizes one or more forming, shaping or working steps which are, in the proper case, assisted by the addition of the gelatinized corn flour.

The flour from which the gelatinized product is made consists of the whole cereal grain except that as much as possible of the hull and the germ are preferably eliminated. As will be noted from the various tables, the flour may be gelatinized in various ways. The consumer may desire to purchase un-gelatinized flour, and gelatinize the same in any suitable manner a short time in advance of its introduction into the ceramic material or mix. He may then add the gelatinized material in the liquid form, that is, the hydrolized cereal product will be in solution or suspended as a colloid in water.

It is more convenient, however, to use the form of material that has been gelatinized by passing the flour rapidly through hot rolls. This material is then pulverized and needs no further treatment to render it useful. It becomes active as soon as it is brought into contact with water, so has greater flexibility in its application than the floour which must be hydrolized by heating in water or by digesting in certain chemical solutions.

The product may be carried into the completely gelatinized or hydrolized state, and is most suitable in some mixes when so prepared. However, in other mixes, for example those in which it is desired to improve the green strength, partial hydrolysis has been found to be better than complete hydrolysis.

The foregoing detailed description has been given for clearness of understanding only, and no unnecessary limitations should be understood therefrom.

What I claim as new, and desire to secure by Letters Patent is:

1. A ceramic mix including as an essential ingredient from approximately 0.5 to 2% of a gelatinized corn flour.

2. A ceramic mix including a large proportion of finely divided clayey material and approximately 0.5 to 2% of gelatinized corn flour.

3. The method of improving ceramic mixes which comprises adding to a ceramic mix an amount not exceeding approximately 2% of a gelatinized corn flour, and uniformly distributing the flour through the ceramic mix.

4. The method of lubricating a dry ceramic mix which comprises distributing uniformly throughout finely divided ceramic material approximately 0.5% to 2% of a gelatinized corn flour, whereby the flow of the dry particles under pressure is substantially improved.

5. The method as set forth in claim 4, in which the cereal flour is gelatinized whole corn flour and it is added in an amout not exceeding approximately 0.5%.

6. The method of improving the bonding strength of ceramic mixes which comprises blending with a ceramic mix a gelatinized whole corn flour in an amount not exceeding approximately 2%.

7. The method as set forth in claim 6, in which the cereal flour is gelatinized whole corn flour and it is added in an amount not exceeding approximately 2%.

8. A pressed ceramic mix including approximately 98% to 99.5% of ceramic material consisting essentially of a finely divided clayey material and 0.5% to 2% of gelatinized corn flour, the gelatinized corn flour being thoroughly distributed throughout the clayey material, the mixture having less volume than the volume of the ceramic mix under the same conditions without the addition of the gelatinized corn flour.

CAMERON G. HARMAN.